United States Patent

Kinoshita

[11] Patent Number: 5,526,911
[45] Date of Patent: Jun. 18, 1996

[54] ONE-WAY CLUTCH

[75] Inventor: Yoshio Kinoshita, Shizuoka-ken, Japan

[73] Assignee: NSK-Warner K.K., Tokyo, Japan

[21] Appl. No.: 453,515

[22] Filed: May 30, 1995

Related U.S. Application Data

[63] Continuation of Ser. No. 104,616, Aug. 11, 1993, abandoned.

[30] Foreign Application Priority Data

Aug. 24, 1992 [JP] Japan .................. 4-059238 U

[51] Int. Cl.⁶ ...................................... F16D 41/07
[52] U.S. Cl. ......................... 192/45.1; 192/41 A
[58] Field of Search ................. 192/45.1, 41 A, 192/41 R, 45; 188/82.84

[56] References Cited

U.S. PATENT DOCUMENTS

| | | | |
|---|---|---|---|
| 4,771,873 | 9/1988 | Kinoshita et al. | 192/41 A |
| 4,882,941 | 11/1989 | Kinoshita | 192/45.1 |
| 4,901,834 | 2/1990 | Lederman | 192/45 |
| 4,909,366 | 3/1990 | Tanaka | 192/45 |
| 4,997,070 | 3/1991 | Kinoshita | 192/41 A |
| 5,016,741 | 5/1991 | Leitz | 192/45.1 |
| 5,024,308 | 6/1991 | Kinoshita et al. | 192/45.1 X |
| 5,183,139 | 2/1993 | Malecha | 192/45.1 X |

FOREIGN PATENT DOCUMENTS

| | | | |
|---|---|---|---|
| 3434499 | 3/1986 | Germany | 192/41 A |
| 1-188726 | 7/1989 | Japan | 192/45.1 |

*Primary Examiner*—Andrea L. Pitts
*Attorney, Agent, or Firm*—Shapiro and Shapiro

[57] ABSTRACT

A one-way clutch comprises relatively rotatable outer and inner races, the outer race having a circular inner circumferential track surface and the inner race having a circular outer circumferential track surface concentric with the inner circumferential track surface, torque transmitting members arranged to transmit torque between the inner and outer circumferential track surfaces, and a cage of substantially oval shape retaining the torque transmitting members. The cage has at an axial end thereof a radially extending annular flange with portions in resilient engagement with one of the inner and outer circumferential track surfaces and having a cut-off portion or portions from a circumference facing that track surface. The use of one or more cut-off portions provides an enhanced spring characteristic of the cage and allows for greater latitude in the dimensional precision of the cage.

18 Claims, 5 Drawing Sheets

ONE-WAY CLUTCH

This is a continuation of application Ser. No. 08/104,616 filed Aug. 11, 1993, now abandoned.

BACKGROUND OF THE INVENTION

1. Field of the Invention

The present invention relates to a one-way clutch used as a part such as a torque transmission and back stop in a power transmission device for an automobile and the like, for example. More particularly, the invention relates to an improved cage for the one-way clutch.

2. Related Background Art

In general, when a one-way clutch is incorporated for use in the rotating part of an industrial machine or the like, the clutch is retained in a rotative member, an outer race or inner race, with a given dragging torque so that the function of the clutch is not affected by vibration, inertia, or the like.

If, for example, the outer race is suddenly accelerated or decelerated, the sprags are caused to slip on the track surface of the outer race due to inertia and generate friction. It is, therefore, necessary to provide a frictional force, or the dragging torque, between the outer cage and the outer race to allow them to rotate together at all times. This is required to transfer the motion of the outer race to the outer cage and assure the motion of the sprags simultaneously.

To obtain a given dragging torque as described above, the entire body of an outer cage is oval in shape including an annular flange for the one-way clutch according to the prior art. Then, the annular flange and the inner circumference of the outer race are arranged to be in contact with each other at both ends of this oval-shaped cage in the direction of its major axis in order to obtain the required dragging torque.

In an example of the prior art, the diameter on the major axis of the oval-shaped cage is made slightly greater than the inner diameter of the outer race to fix them by the application of the spring force exerted by the distortion of the entire body of the cage so that the outer cage is stationary in contact with the outer race for obtaining the dragging torque.

Nevertheless, there are problems given below in the one-way clutch which has an oval-shaped cage of a conventional type as described above. First of all, it is difficult to thin the entire body of the cage or the annular flange as much as desired due to the strength factor to be taken into account. Because of this, its rigidity is set comparatively high, leading to a greater variation of the spring force (spring capability and elastic modulus) even when the dimension slightly varies in its major axis direction.

As a result, in order to obtain a required spring capability, it is necessary to strictly control the dimensions of the oval shape, particularly in its major axis direction. It is also difficult to machine the oval-shaped cages while controlling the dimensions strictly.

Furthermore, since there is a need for such a strict control of the dimensional precision, the design flexibility is rather low which can make it difficult to obtain a spring capability that is appropriately suited for a particular purpose.

SUMMARY OF THE INVENTION

It is an object of the present invention to provide a simply structured one-way clutch capable of obtaining a stabilized dragging torque without reducing the strength of its cage, and which can easily achieve a suitable spring capability in a simpler process with a dimensional precision which can be rough, and further which enables the design flexibility to be improved.

It is another object of the present invention to provide a one-way clutch having relatively rotatable outer and inner races, the outer race having a circular inner circumferential track surface and the inner race having a circular outer circumferential track surface concentric with the inner circumferential track surface of the outer race, torque transmitting members arranged to transmit torque between the inner and outer circumferential track surfaces, and a cage of substantially oval shape retaining the torque transmitting members substantially in a cyclotomic manner, wherein the cage has at an axial end thereof a radially extending annular flange with portions in resilient engagement with one of the inner and outer circumferential track surfaces and having a cut-off portion from a circumference facing that track surface.

In order to achieve the above-mentioned objects, a one-way clutch according to the present invention is provided with cut-off portions either in the inner circumference or the outer circumference of the annular flange extending in the radial direction of the oval-shaped cage.

With the structure described as above, it is possible to obtain the required dragging torque, and at the same time, to provide a one-way clutch by which a suitable spring capability is easily obtainable with greater latitude in control of dimensional precision.

The cage has an annular flange extending in the radial direction of its substantially oval shape with cut-off portions arranged on the outer circumference thereof. Therefore, a part of the outer circumference of the cage is in contact with the inner track surface of the circular outer race, which is an exact circle, to make it possible to generate a dragging torque by a friction force exerted on the contacting surface with the outer race, and obtain the required spring capability at the same time.

DETAILED DESCRIPTION OF THE PREFERRED EMBODIMENTS

Figure 1:
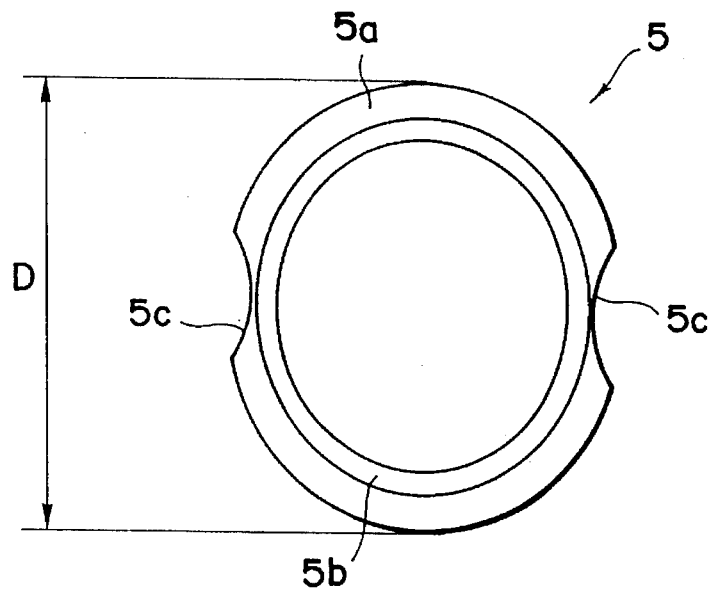
FIG. 1 is a front view showing an outer cage according to a first embodiment according to the present invention.

Hereinafter, with reference to the accompanying drawings, detailed description will be made of the preferred embodiments according to the present invention. The invention is, of course, not limited to the illustrative embodiments, which are merely exemplary. In the drawings, corresponding portions are designated by the same reference numbers.

Figure 6:
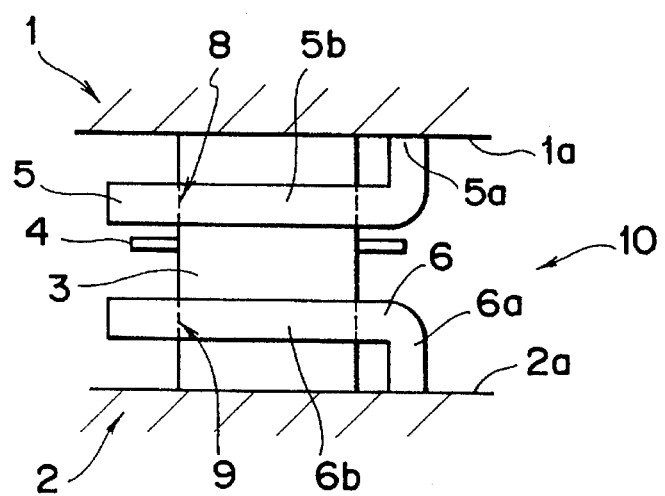
FIG. 6 is a cross-sectional view showing a one-way clutch for which the outer cage of each embodiment according to the present invention is used.

FIG. 6 is a cross-sectional view in the axial direction of a one-way clutch 10 according to an embodiment of the present invention. In the form shown, a gourd-shaped sprag is used as the torque transmitting member, but the present invention is applicable to one-way clutches of other types. In FIG. 6, an outer race 1, has an inner circumference which is a track surface 1a which is substantially an exact circle. Also, an inner race 2, has and outer circumference which is a track surface 2a which is substantially an exact circle. The outer race 1 and inner race 2 are relatively rotatable with the track surfaces 1a and 2a which are oppositely arranged to each other.

In an annular space formed by the outer race 1 and inner race 2, a plurality of torque transmitting members, that is, the gourd-shaped sprags 3, are arranged in a cyclotomic manner to transmit torque between the inner and outer races. Each sprag 3 is supported by a pair of cages. In particular, each is retained in the substantially oblong windows 8 and 9 provided respectively in the outer cage 5 and the inner cage 6. Between the outer and inner cages 5 and 6, a ribbon spring 4 is arranged to bias the sprag 3 in the direction where it engages with each of the track surfaces of the inner race 2 and outer race 1.

As clear from FIG. 6, the inner cage 6 having the inner diameter which is substantially an exact circle is provided with an annular flange 6a extending a given distance substantially vertically, or in the radial direction inwardly, at one end in the axial direction, and a cylinder 6b is integrally formed therewith. The inner circumference of the flange 6a faces the inner race 2 with a given clearance, but it is in contact with the inner race 2 at a part of the inner circumference.

Also, the substantially oval outer cage 5 has an annular flange 5a extending a given distance substantially vertically, or in the radial direction outwardly, at one end in the axial direction.

FIG. 1 is a front view showing a cage of a first embodiment according to the present invention, that is, the outer cage 5. The outer cage 5 comprises a cylinder 5b having a plurality of windows 8 (FIG. 1a) with which the sprags 3 engage, and an annular flange 5a extending outwardly in the radial direction from the cylinder 5b. The cylinder 5b and the flange 5a are formed integrally.

In the flange 5a, there are provided two cut-off portions 5c in positions substantially opposite to each other in the minor axis direction of the oval-shaped outer cage 5, that is, in the portions equally divided in the circumferential direction. The cut-off portions 5c are provided from the outer side of the flange 5a inwardly in the radial direction and have a curved contour. The bottoms of the cut-off portions 5c are in contact with the outer circumference of the cylinder 5b. In this respect, according to the embodiment shown in FIG. 1, the two cut-off portions 5c are provided, but it may be possible to provide only one cut-off portion.

Further, the arrangement is made to allow both ends of the flange 5a where no cut-off portions 5c are provided to be positioned in the major axis direction D of the oval-shaped outer cage 5 as shown in FIG. 1. The ends of the flange 5a are in contact with the inner track surface 1a of the outer race 1. In the embodiment shown in FIG. 1, the cut-off portions 5c are arranged in the positions substantially opposite along the circumferential direction of the outer cage 5, that is, the positions substantially opposite to each other in the minor axis direction of the oval shape.

Figure 2:
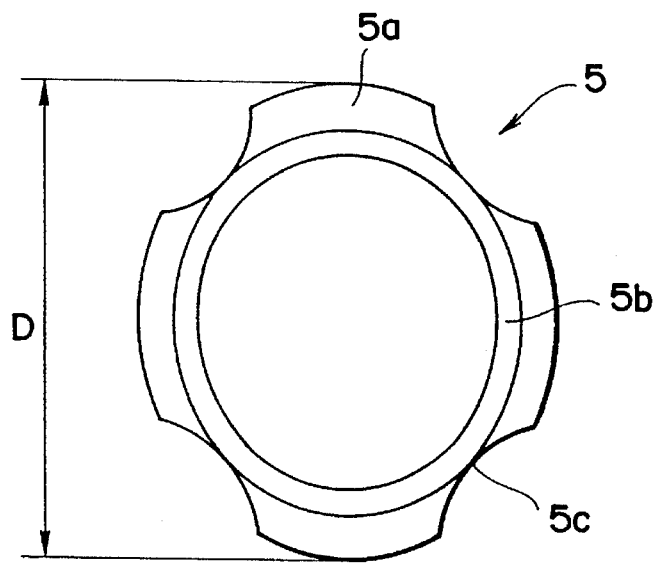
FIG. 2 is a front view showing an outer cage according to a second embodiment according to the present invention.

FIG. 2 is a front view showing the outer cage 5 according to a second embodiment of the present invention. In the second embodiment, four cut-off portions 5c are provided in the equally divided parts of the outer cage 5 in the circumferential direction. In the present embodiment, too, the arrangement is made so that ends of the flange 5a are positioned in the major axis direction D of the outer cage 5. In the same manner as the first embodiment, the bottoms of the cut-off portions 5c are in contact with the outer circumference of the cylinder 5b.

Figure 3:
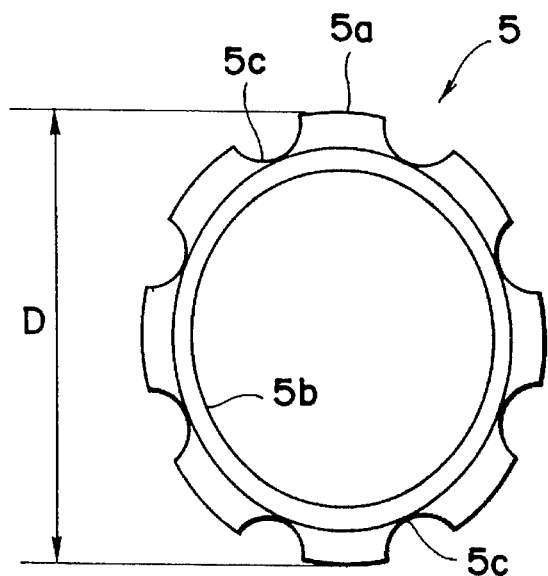
FIG. 3 is a front view showing an outer cage according to a third embodiment according to the present invention.

FIG. 3 is a front view showing the outer cage 5 according to a third embodiment of the present invention. In the third embodiment, eight cut-off portions 5c are provided in the equally divided parts of the outer cage 5 in the circumferential direction. In the present embodiment, too, the arrangement is made so that ends of the flange 5a are positioned in the major axis direction D of the outer cage 5. In the same manner as the other embodiments, the bottoms of the cut-off portions 5c are in contact with the outer circumference of the cylinder 5b.

Figure 4:
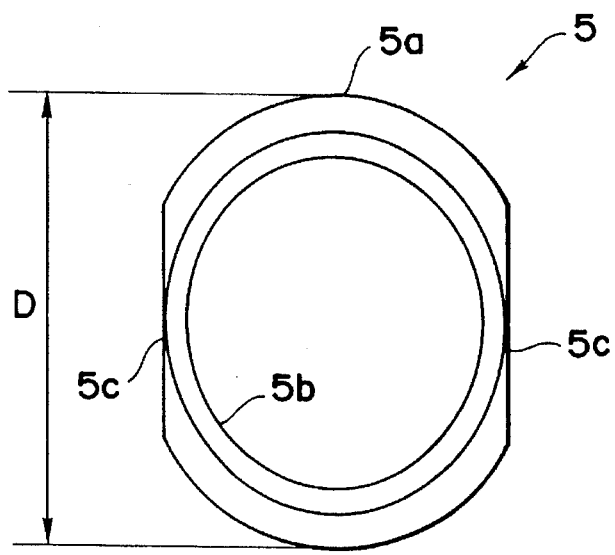
FIG. 4 is a front view showing an outer cage according to a fourth embodiment according to the present invention.

FIG. 4 is a front view showing the outer cage 5 according to a fourth embodiment of the present invention. In the fourth embodiment, two cut-off portions 5c are provided in the equally divided parts of the outer cage 5 in the circumferential direction as in the first embodiment shown in FIG. 1. In the present embodiment, however, the cut-off portions 5c are not curved, but are formed by cutting off in straight lines so that the ends of the flange 5a are in contact with the outer circumferential surface of the cylinder 5b. In the same manner as the other embodiments, the bottoms of the cut-off portions 5c are in contact with the outer circumference of the cylinder 5b.

Figure 5:
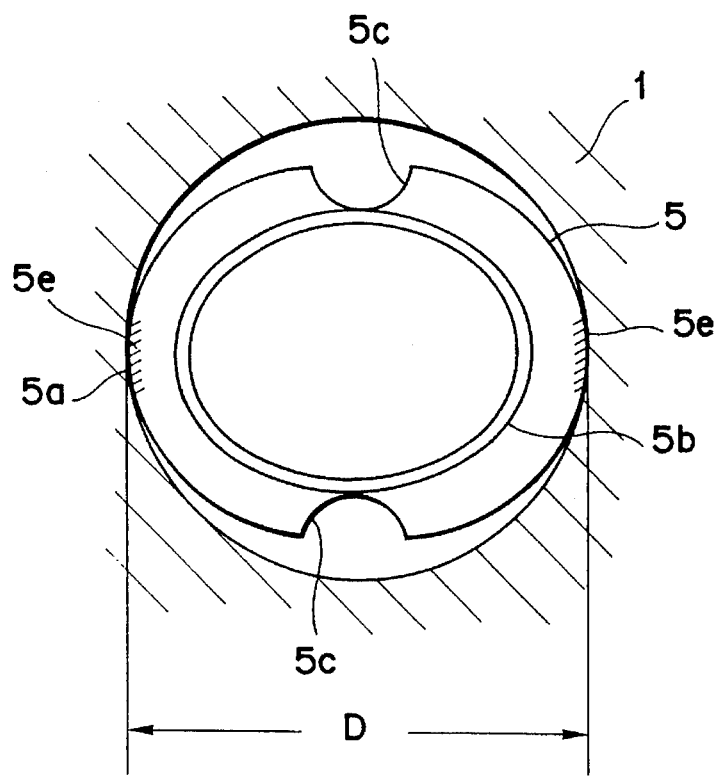
FIG. 5 is a cross-sectional view in the axial direction illustrating the state where the outer cage of the first embodiment according to the present invention is mounted on the outer race.

FIG. 5 is a cross-sectional view in the axial direction showing the state where the outer cage 5 of the first embodiment is mounted on the outer race 1. As already referred to in the description of the first embodiment, the substantially oval-shaped outer cage 5 is in contact with the inner circumferential track surface of the outer race 1, which is substantially an exact circle, at both ends of the flange 5a in the major axis direction of the cage. In any one of the first to fourth embodiments, the outer cage 5 is similarly in contact with the inner circumferential track surface of the outer race 1 at the two points on both ends or two contacting regions 5a, which are oppositely positioned in the major axis direction.

Here, with reference to FIG. 7, the description will be made of the relationship between the applied load regions (designed values) and the displacements in the outer cage according to the present invention. In this respect, the loads are applied in the major axial direction of the outer cage, and the displacements then are compared in each of the embodiments. A straight line P represents the displacements when the loads are applied in the major axial direction of an oval cage according to the prior art, that is, the one having the annular flange which does not have any cut-off portion at all. In the prior art, the range of the displacements in the applied load range (designed values) L is the displacement range p as shown in FIG. 7.

In contrast, according to each of the embodiments of the present invention, the relationships are as given below. The first embodiment is represented by a straight line A where it is displaced in the displacement range a with respect to the applied load region L. Also, the second embodiment, represented by the line B, is displaced in the displacement range b with respect to the applied load region L. Further, the third embodiment, represented by the line C, is displaced in the displacement range c with respect to the applied load range L. In this respect, the fourth embodiment is considered to follow those represented by the first embodiment.

Figure 7:
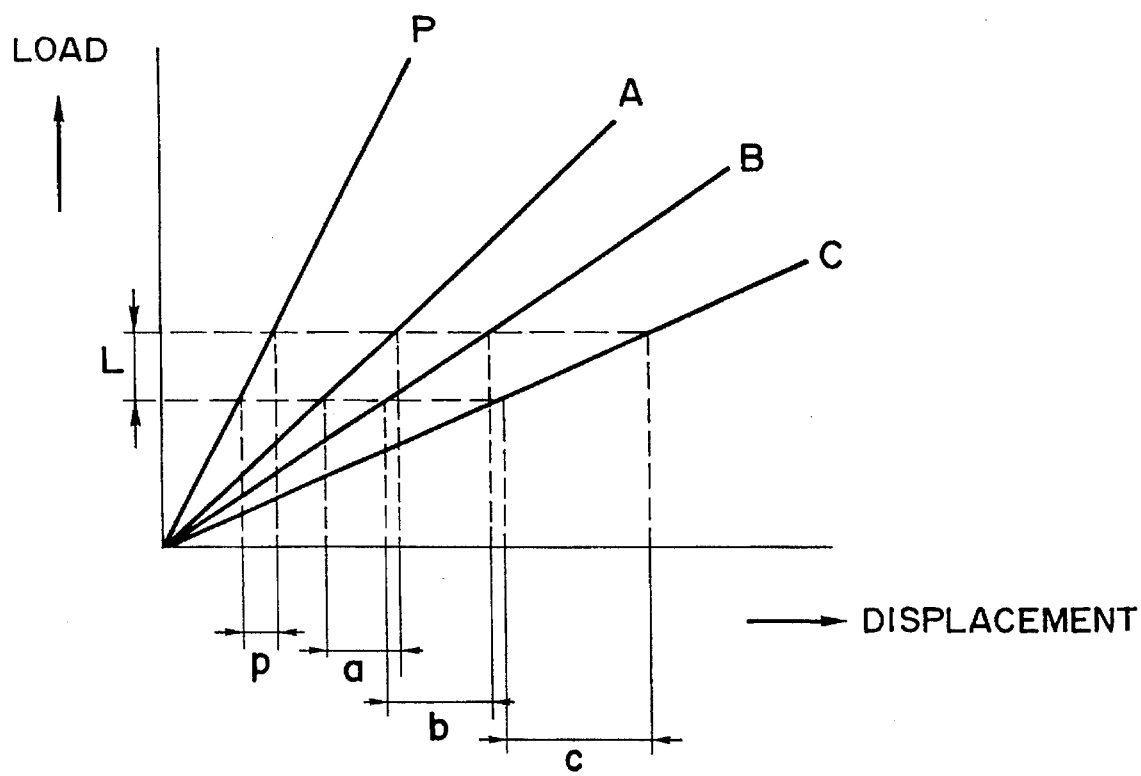
FIG. 7 is a graph showing the relationship between the loads in the direction of the major axis and the displacements when the loads are given to outer cages according to the present invention and the prior art.

As is readily understandable from FIG. 7, the displacement ranges a, b, and c of the outer cages according to the respective embodiments of the present invention are greater than the displacement range p of the oval-shaped outer cage of the prior art. It will also be appreciated that when the embodiments are compared the displacement ranges become greater against the given range L of the applied load in order of the first, second, and third embodiments. From this, it can be concluded that the more the number of the cut-off portions, the greater becomes the disposition range against the given range L of the applied load.

From the above, it follows that for a given range L of the applied load, which is a designed value, the number of the cut-off portions should be as many as possible. In this case, the wider displacement range brings about a wider allowable range, leading to a quality stabilization.

Also, in FIG. 7, it is clear that the range L of the applied load expands in order of the prior art, the first embodiment, second embodiment, and third embodiment when a given displacement range is established, that is, the displacement range is defined at a given value, and then the applicable load range is obtained against such a value. In other words, the flexibility in the applied load range is high when the displacement range is defined in each of the embodiments according to the present invention. The reason why the outer cage of the present invention has a wider displacement range as shown in FIG. 7 is that it has a spring capability (elastic modulus) which has been generated by providing the cut-off portions on its annular flange. Then, this spring capability can be varied by changing the number of the cut-off portions. In general, increasing the number of the cut-off portions makes the spring constant smaller.

It is possible to determine the required spring coefficient by appropriately adjusting the number, depth, size, configuration, and angle of the cut-off portions to be provided for the flange. In each of the above-mentioned embodiments, the cut-off portions are arranged so that their bottoms become flush with the outer circumference of the cylinder, that is, they are in contact with the cylinder. However, it is not necessary for them to be in contact with the cylinder. The cut-off can be made slightly shallower, of course.

Also, the cut-off portions in the second embodiment can be provided linearly as in the fourth embodiment. Further, depending on the size of the one-way clutch, that is, depending on the diameter of the outer cage, it is possible to determine the number, depth, size, configuration, and angle of the cut-off portions.

Figure 8:
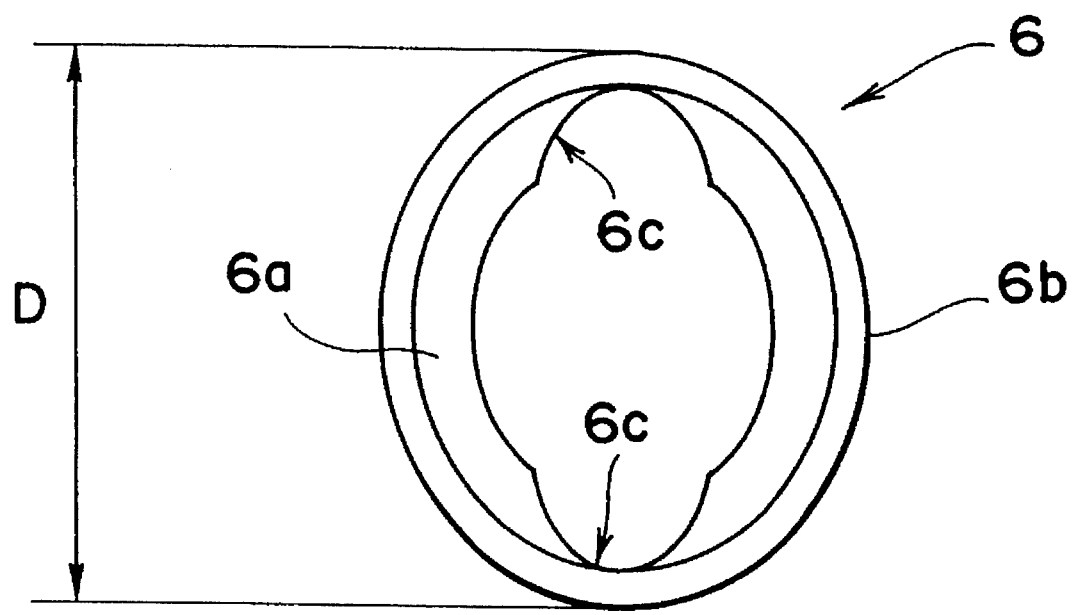
FIG. 8 is a front view showing an example of the inner cage having cut-off portions.

FIG. 8 is a front view showing an inner cage representing an embodiment in which the present invention is applied to the inner cage. The inner cage 6 comprises a cylinder 6b having a plurality of the windows 9 (FIG. 6) with which a sprag 3 engages, and an annular flange 6a extending inwardly from the cylinder 6b in the radial direction. The cylinder 6b and flange 6a are formed integrally. In a case of the inner cage, the cut-off portions 6c are provided at the ends in the major axis direction D of the oval shape, and the flange is in contact with the outer circumferential track surface of the inner race 2 in the minor axis direction.

In each of the above-mentioned embodiments according to the present invention, the description has been made of a one-way clutch having two cages, namely, the outer and inner cages. However, the present invention is of course applicable to the one-way clutch having a single cage, that is, the one-way clutch having either of the outer and inner cages described above.

In each of the foregoing embodiments, the cut-off portions are provided for the annular flange in a cyclotomic manner, but they need not necessarily be divided equally. Also, the number of the cut-off portions can be arbitrary.

According to a one-way clutch of the present invention set forth above, it is possible to obtain the following effect.

Unlike the prior art, it becomes easier to adjust the spring capability (elastic modulus) of the cage as a whole by providing cut-off portions on the circumference of the annular flange extending in the radial direction of the cage.

Also, compared to the conventional oval cage, the spring constant can be small. As a result, the cage is not greatly affected by the variation of dimensions due to the uneven quality, friction, and the like. There is also no need for any rigid dimensional precision. Therefore, it becomes easier to provide a dimensional control of the major axis of the oval, which has hitherto been particularly difficult.

What is claimed is:

1. A one-way clutch comprising relatively rotatable outer and inner races, the outer race having a circular inner circumferential track surface and the inner race having a circular outer circumferential track surface concentric with said inner circumferential track surface, torque transmitting members disposed between said inner and outer circumferential track surfaces to transmit torque therebetween, and a cage retaining said torque transmitting members, wherein said cage is of substantially oval shape and has at an axial end thereof a radially extending annular flange with portions in resilient engagement with one of said inner and outer circumferential track surfaces, said flange having a cut-off portion from a circumference facing said one track surface.

2. A one-way clutch according to claim 1, wherein said flange has a plurality of said cut-off portions.

3. A one-way clutch according to claim 2, wherein said flange is in contact with said inner circumferential track surface at opposed portions on a major axis of said oval shape.

4. A one-way clutch according to claim 2, wherein said flange is in contact with said outer circumferential track surface at opposed portions on a minor axis of said oval shape.

5. A one-way clutch according to claim 1, wherein said flange is in contact with said inner circumferential track surface at opposed portions on a major axis of said oval shape.

6. A one-way clutch according to claim 1, wherein said flange is in contact with said outer circumferential track surface at opposed portions on a minor axis of said oval shape.

7. A one-way clutch comprising relatively rotatable outer and inner races, the outer race having a circular inner circumferential track surface and the inner race having a circular outer circumferential track surface concentric with said inner circumferential track surface, torque transmitting members disposed between said inner and outer circumferential track surface to transmit torque therebetween, and a cage retaining said torque transmitting members, wherein said cage is of substantially oval shape and has at an axial end thereof a radially extending annular flange with portions in resilient engagement with one of said inner and outer circumferential track surfaces, said flange having a plurality of cut-off portions from a circumference facing said one track surface, said cut-off portions being symmetrically disposed to either side of a major axis of said oval shape.

8. A one-way clutch comprising relatively rotatable outer and inner races, the outer race having a circular inner circumferential track surface and the inner race having a circular outer circumferential track surface concentric with said inner circumferential track surface, torque transmitting members disposed between said inner and outer circumferential track surfaces to transmit torque therebetween, and a cage retaining said torque transmitting members, wherein said cage is of substantially oval shape and has at an axial end thereof a radially extending annular flange with portions in resilient engagement with one of said inner and outer circumferential track surfaces, said flange having a plurality of cut-off portions from a circumference facing said one track surface, said cut-off portions being symmetrically disposed to either side of a minor axis of said oval shape.

9. A one-way clutch comprising relatively rotatable outer and inner races, the outer race having a circular inner circumferential track surface and the inner race having a circular outer circumferential track surface concentric with said inner circumferential track surface, torque transmitting members disposed between said inner and outer circumferential track surfaces to transmit torque therebetween, and inner and outer cages of substantially oval shape retaining said torque transmitting members, wherein said outer cage has at an axial end thereof a radially outwardly extending annular flange with portions in resilient engagement with said inner circumferential track surface, said flange having a cut-off portion from an outer circumference thereof.

10. A one-way clutch according to claim 9, wherein said flange has a plurality of said cut-off portions.

11. A one-way clutch according to claim 10, wherein said flange is in contact with said inner circumferential track surface at opposed portions on a major axis of the oval shape of said outer cage.

12. A one-way clutch according to claim 9, wherein said flange is in contact with said inner circumferential track surface at opposed portions on a major axis of the oval shape of said outer cage.

13. A one-way clutch comprising relatively rotatable outer and inner races, the outer race having a circular inner circumferential track surface and the inner race having a circular outer circumferential track surface concentric with said inner circumferential track surface, torque transmitting members disposed between said inner and outer circumferential track surfaces to transmit torque therebetween, and inner and outer cages of substantially oval shape retaining said torque transmitting members, wherein said outer cage has at an axial end thereof a radially extending annular flange with portions in resilient engagement with said inner circumferential track surface, said flange having a plurality of cut-off portions from an outer circumference thereof, said cut-off portions being symmetrically disposed to either side of a major axis of the oval shape of said outer cage.

14. A one-way clutch comprising relatively rotatable outer and inner races, the outer race having a circular inner circumferential track surface and the inner race having a circular outer circumferential track surface concentric with said inner circumferential track surface, torque transmitting members disposed between said inner and outer circumferential track surfaces to transmit torque therebetween, and inner and outer cages of substantially oval shape retaining said torque transmitting members, wherein said inner cage has at an axial end thereof a radially inwardly extending annular flange with portions in resilient engagement with said outer circumferential track surface, said flange having a cut-off portion from an inner circumference thereof.

15. A one-way clutch according to claim 14, wherein said flange has a plurality of said cut-off portions.

16. A one-way clutch according to claim 15, wherein said flange is in contact with said outer circumferential track surface at opposed portions on a minor axis of the oval shape of said inner cage.

17. A one-way clutch according to claim 14, wherein said flange is in contact with said outer circumferential track surface at opposed portions on a minor axis of the oval shape of said inner cage.

18. A one-way clutch comprising relatively rotatable outer and inner races, the outer race having a circular inner circumferential track surface and the inner race having a circular outer circumferential track surface concentric with said inner circumferential track surface, torque transmitting members disposed between said inner and outer circumferential track surfaces to transmit torque therebetween, and inner and outer cages of substantially oval shape retaining said torque transmitting members, wherein said inner cage has at an axial end thereof a radially extending annular flange with portions in resilient engagement with said outer circumferential track surface, said flange having a plurality of cut-off portions from an inner circumference thereof, said cut-off portions being symmetrically disposed to either side of a minor axis of the oval shape of said inner cage.

* * * * *